United States Patent
Lauhoff

(10) Patent No.: US 10,286,886 B2
(45) Date of Patent: May 14, 2019

(54) PRESSURE MODULATOR FOR AN ABS SYSTEM

(71) Applicant: BRAKE FORCE ONE GMBH, Tuebingen (DE)

(72) Inventor: Jakob Lauhoff, Tuebingen (DE)

(73) Assignee: BRAKE FORCE ONE GMBH, Tuebingen (DE)

( * ) Notice: Subject to any disclaimer, the term of this patent is extended or adjusted under 35 U.S.C. 154(b) by 34 days.

(21) Appl. No.: 15/642,681

(22) Filed: Jul. 6, 2017

(65) Prior Publication Data
US 2018/0009423 A1 Jan. 11, 2018

(30) Foreign Application Priority Data
Jul. 7, 2016 (DE) .................. 10 2016 112 491

(51) Int. Cl.
*B60T 8/42* (2006.01)

(52) U.S. Cl.
CPC .............. *B60T 8/42* (2013.01); *B60T 8/4266* (2013.01)

(58) Field of Classification Search
CPC ............ B60T 8/42; B60T 8/4266; B60T 8/40
See application file for complete search history.

(56) References Cited

U.S. PATENT DOCUMENTS

| | | | |
|---|---|---|---|
| 4,275,934 A | 6/1981 | MacDonald | |
| 4,435,021 A | 3/1984 | Hoenick | |
| 4,714,300 A | 12/1987 | Heess et al. | |
| 4,900,104 A | 2/1990 | Clifford | |
| 4,957,331 A | 9/1990 | Burton et al. | |
| 5,332,304 A | 7/1994 | Maas | |
| 5,443,306 A | 8/1995 | Broome | |
| 5,590,936 A * | 1/1997 | Reuter | B60T 8/341 303/116.1 |
| 5,941,611 A | 8/1999 | Trzmiel et al. | |
| 6,206,485 B1 | 3/2001 | Feigel et al. | |
| 6,679,566 B2 | 1/2004 | Reuter | |
| 2004/0207256 A1 | 10/2004 | Volz | |
| 2014/0285987 A1 | 9/2014 | Nagashima | |

(Continued)

FOREIGN PATENT DOCUMENTS

DE   28 54 574       6/1979
DE   35 26 189 A1    2/1987

(Continued)

OTHER PUBLICATIONS

Japanese Office Action dated Jun. 19, 2018 (with English translation) Japanese Office Action dated Jun. 21, 2018 (with English translation).

*Primary Examiner* — Melanie Torres Williams
(74) *Attorney, Agent, or Firm* — Collard & Roe, P.C.

(57) ABSTRACT

A pressure modulator for an antilock braking system (ABS) has a housing with a hydraulic inlet and a hydraulic outlet, the hydraulic inlet and outlet interconnected via a hydraulic line; a volume accumulator arranged to be opened against a spring force of a spring element and which increases a volume of the hydraulic line during an activated anti-lock function. A linear drive is provided with a rotor bar, where a displacement movement of the rotor bar effectuates an opening of the volume accumulator. The spring element is supported at least indirectly on the housing and the rotor bar, where the spring element is disposed in the rotor bar.

14 Claims, 3 Drawing Sheets

(56) References Cited

U.S. PATENT DOCUMENTS

2017/0333963 A1* 11/2017 Cho ..................... B21B 17/08
2018/0009424 A1    1/2018 Lauhoff

FOREIGN PATENT DOCUMENTS

| | | |
|---|---|---|
| DE | 69309173 T2 | 7/1997 |
| DE | 197 20 636 | 11/1998 |
| DE | 10 2008 019 469 | 10/2009 |
| DE | 10 2014 007 717 | 9/2015 |
| EP | 0 580 382 | 1/1994 |
| GB | 1 413 969 | 11/1975 |
| JP | 61-181751 | 8/1986 |
| JP | S61181751 A | 8/1986 |
| JP | S6317154 A | 1/1988 |
| JP | H06156237 A | 6/1994 |
| JP | 2015-74345 | 4/2015 |
| KR | 20110124602 A * | 11/2011 |
| WO | WO 81/00697 | 3/1981 |
| WO | WO 97/29934 | 8/1997 |

* cited by examiner

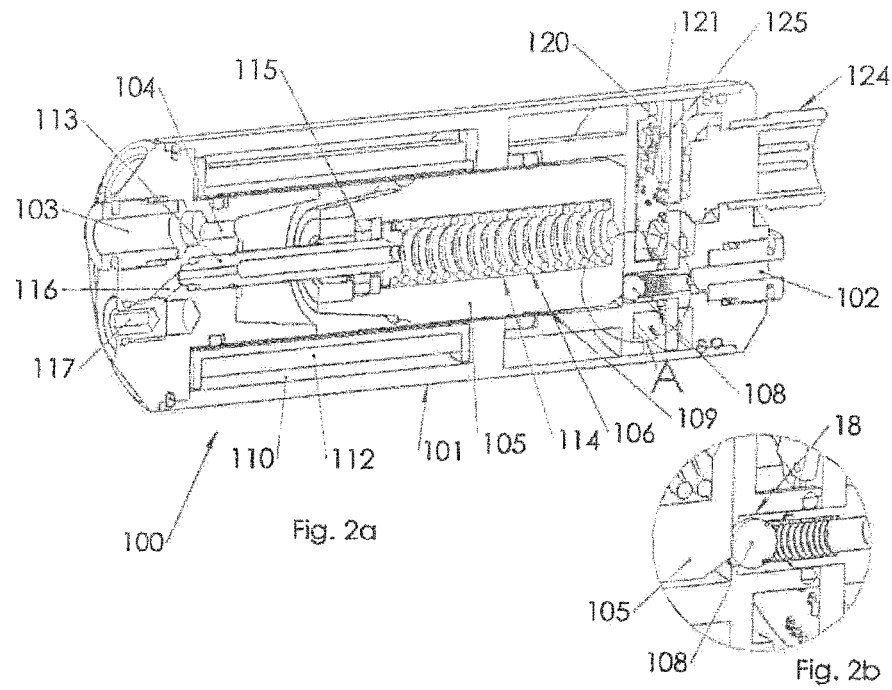
Fig. 2a
Fig. 2b
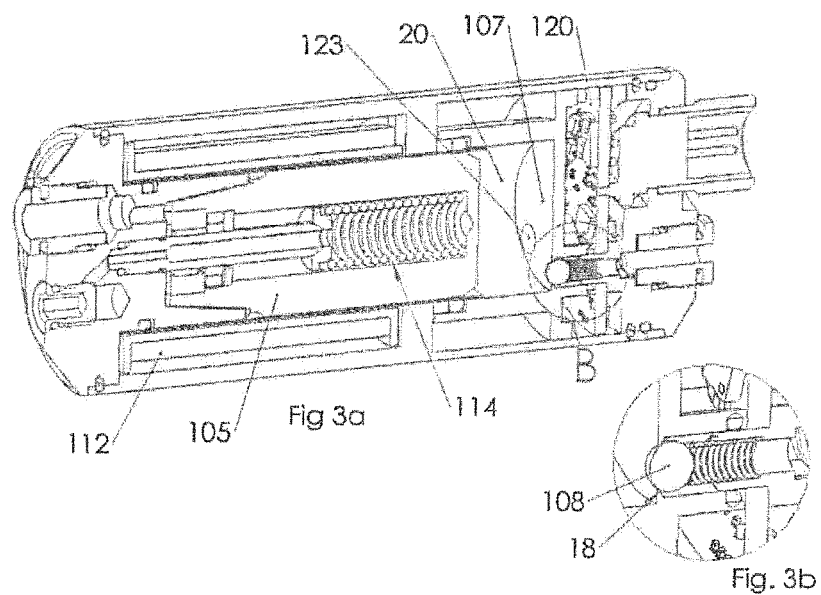
Fig 3a
Fig. 3b

PRESSURE MODULATOR FOR AN ABS SYSTEM

CROSS-REFERENCE TO A RELATED APPLICATION

The invention described and claimed hereinbelow is also described in German Patent Application DE 10 2016 112 491.5, filed on Jul. 7, 2016. The German Patent Application, the subject matter of which is incorporated herein by reference, provides the basis for a claim of priority of invention under 35 U.S.C. 119(a)-(d).

BACKGROUND OF THE INVENTION

The present invention relates to a pressure modulator for an antilock braking system (ABS) comprising a housing with a hydraulic inlet and a hydraulic outlet that are interconnected via a hydraulic line, a volume accumulator that is to be opened against a spring force of a spring element and that increases the volume of the hydraulic line during an activated anti-lock function, and a linear drive with a rotor bar, wherein a displacement movement of the rotor bar effectuates and opening of the volume accumulator and wherein the spring element is supported at least indirectly on the housing and the rotor bar.

Conventional pressure modulators are known. For example, a pressure modulator is described in DE 10 2014 007 717 B3. Such disclosed pressure modulator, however, has a relatively great length. More importantly, perhaps, one part of the hydraulic line of the disclosed pressure modulator is movable relative to the housing of the pressure modulator, rendering the pressure modulator susceptible to malfunction.

SUMMARY OF THE INVENTION

The present invention overcomes the shortcomings of known arts, such as those mentioned above.

The invention provides a pressure modulator for an ABS system for an ABS system of a bicycle, where the pressure modulator is particularly compact and functionally reliable.

In an embodiment, the pressure modulator for an ABS system comprises a housing with a hydraulic inlet and a hydraulic outlet that are interconnected via a hydraulic line. A volume accumulator configured to be opened against a spring force of a spring element is included, which increases the volume of the hydraulic line during an activated anti-lock function. A linear drive with a rotor bar operates such that a displacement movement of the rotor bar effectuates the opening of the volume accumulator. The spring element is supported at least indirectly on the housing and the rotor bar, and the spring element is disposed in the rotor bar.

As the spring element is disposed in the rotor bar, the housing can be shortened by approximately the length of the spring element. A pressure modulator which is compact and is shorter as compared to prior art pressure modulators, is obtained as a result. In addition, the arrangement according to the invention makes it possible to prevent one part of the hydraulic line from being movable relative to the housing of the pressure modulator, whereby functional reliability of the pressure modulator is increased. In addition, the number of dynamic seals is reduced.

The compact design of the pressure modulator also is supported by use of a control piston that extends into the rotor bar, that is fixedly connected to the housing, and on which the spring element is supported. The control piston, the spring element, and the rotor bar are preferably coaxially disposed. The length of the control piston and the compressed spring element can substantially correspond to the length of the rotor bar.

Further advantages result when the pressure modulator comprises precisely one dynamic seal which acts between the rotor bar and the control piston. The functional reliability can be increased when few dynamic seals are provided.

The control piston is designed as a hollow body. It is thereby possible to remove hydraulic fluid that gets into the interior of the rotor bar, for example, due to slip leakage in an area of the dynamic seal. In this context, it is advantageous when the control piston is connected to a closeable liquid outlet. The liquid outlet can be provided, for example, in an end face of the housing.

Advantages result when the rotor bar is disposed in the hydraulic line in such a way that hydraulic medium can flow around the rotor bar. In particular, the rotor bar can be guided in the housing and the hydraulic fluid can effectuate a lubrication of the rotor bar, and so the rotor bar is movable in the housing in a low-wear and low-friction manner. In particular, the hydraulic medium can be conducted through via the guidance play between the rotor bar and a guide bushing.

It can also be provided that the rotor bar comprises at least one hydraulic fluid recess. For example, the rotor bar may have on its lateral face, at least one groove extending helically or in the longitudinal direction of the rotor bar. Hydraulic fluid can therefore flow along the rotor bar by the groove. Alternatively, or additionally, it is conceivable that the rotor bar has passage openings oriented in the longitudinal direction of the rotor bar, through which hydraulic fluid can flow from the hydraulic inlet to the hydraulic outlet of the pressure modulator.

According to an embodiment, a valve arrangement, which is actuated by the rotor bar, is provided in the hydraulic line. The valve can be opened by the rotor bar when the rotor bar is located in a home position, i.e., is pressed into a predefined position by the spring element up to a defined maximum pressure. As a result, the rotor bar can press, for example, against a spring-loaded ball of a non-return valve and thereby open the valve. However, if the anti-lock function is activated and the rotor bar is moved against the spring force of the spring element, the contact between the rotor bar and the ball of the valve is released, and so the ball closes the valve and a further supply of hydraulic fluid through a master cylinder is blocked. Due to a valve arrangement designed in this way, only one single valve in the pressure modulator is necessary. As an alternative to the ball, a component having a seal applied thereon also would operate according to the inventive principles, the component closing a bore hole between the hydraulic inlet and the rotor bar.

An electronic circuit can be disposed in the housing and fully integrated into the pressure modulator. The electronic circuit, which is used for controlling the linear drive, is therefore provided in the pressure modulator. A particularly space-saving arrangement therefore results. All time-critical signals, calculations, power output stages, etc., can therefore be generated or present within the pressure modulator, and so fewer safety-technical and time-critical signal connections are necessary.

In addition, a pressure sensor, which detects the pressure in the volume accumulator, is provided. The pressure sensor is connected to the volume accumulator via a direct hydraulic connection. This is a low-cost, simple solution which requires little space.

In this case, the pressure sensor can be disposed on a printed circuit board comprising the electronic circuit. The pressure sensor can be directly integrated on the printed circuit board in a particularly low-cost way using SMD technology.

Due to the integration of the printed circuit board into the robust metallic housing of the pressure modulator, the printed circuit board is protected against environmental influences such as dirt, water and dust, and against EMC interferences such as radiation from other control devices, motors, or the like. The integration of the pressure sensor, the acceleration sensor, and the microcontroller also prevents an interference of the signals by magnetic fields, since signal paths between the sensor and the controller are quasi no longer present.

The surroundings of the pressure modulator also are protected against radiation from the pressure modulator and its electronics due to the integration into the metallic housing. In this way, requirements on electromagnetic compatibility can be more easily implemented.

The electronic circuit can be disposed in a separate chamber of the housing and, therefore, protected against hydraulic fluid. The electronic circuit is located axially next to the volume accumulator. To enable hydraulic fluid to enter the volume accumulator, the hydraulic line is routed through the electronic circuit, in particular the printed circuit board of the electronic circuit. Possible positions are, on the one hand, an arrangement between the hydraulic inlet and the volume accumulator, or between the volume accumulator and the hydraulic outlet.

The scope of the invention also covers a hydraulic brake system having an anti-lock function and comprising a master cylinder which generates a hydraulic pressure and which is connected to a wheel brake in a hydraulically communicating way via a hydraulic line, in which a pressure modulator according to the invention is disposed.

The invention also includes installing the hydraulic inlet, the hydraulic output, and the electronic circuit on one side. This is advantageous when all lines on the bicycle are routed to the actuator from the same direction, and when, for example, the actuator is to be "hidden" in the interior of the body. In this case, however, two hydraulic passages through the electronic circuit are required.

The electronic circuit is well protected due to its placement in the interior of the housing. An additional housing for the electronic circuit, therefore, can be dispensed with.

The housing of the pressure modulator can have a cylindrical outer shape, and so a simple installation on a vehicle can take place, for example, via clamps or via insertion in tubes. This also makes it easier to seal the housing with respect to external influences in a low-cost way by use of O-rings.

BRIEF DESCRIPTION OF THE DRAWINGS

Further features and advantages of the invention will become apparent from the description of embodiments that follows, with reference to the attached figures, wherein:

FIG. 2a depict a perspective sectional view of a pressure modulator, in which the parts necessary for the anti-lock function are integrated, in a case of a non-activated ABS function;

FIG. 2b depicts a detail A from FIG. 2a;

FIG. 3a depicts the pressure modulator of FIG. 2a, in a case of an activated ABS function;

FIG. 3b depicts a detail B from FIG. 3a;

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
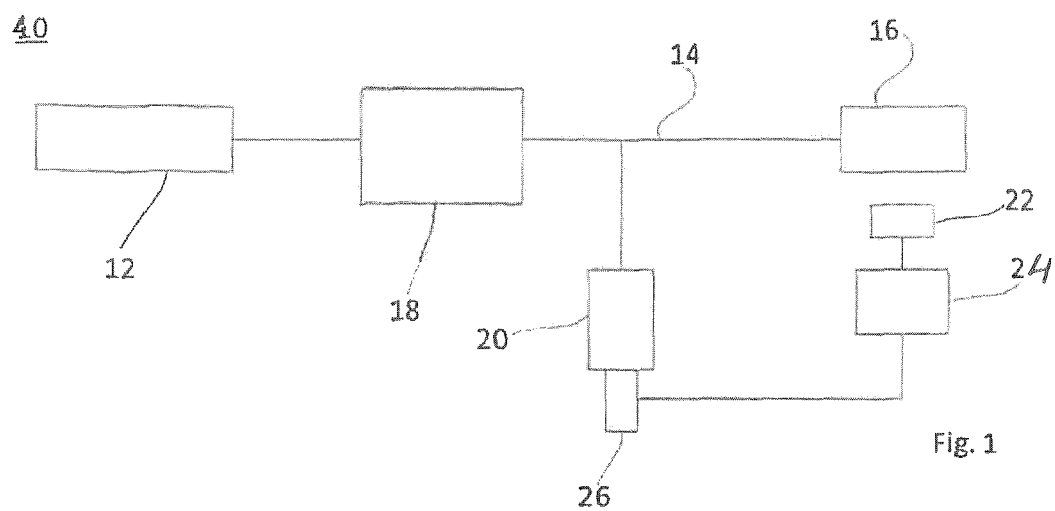
FIG. 1 is a schematic representation of a hydraulic brake system having an anti-lock function for a bicycle.

FIG. 1 shows a brake system having an anti-lock function for an electric bicycle, which is labeled overall with the reference number 10.

The hydraulic brake system 10 comprises a master cylinder 12 that is actuated, e.g., via a brake lever, and which is connected to a wheel brake 16 in a hydraulically communicating way via a hydraulic line 14. The hydraulic pressure necessary for the response of the wheel brake 16 is generated via the master cylinder 12 in a known way.

As FIG. 1 further shows, a valve arrangement 18 is disposed downstream from the master cylinder 12. In addition, the hydraulic brake system 10 comprises a volume accumulator 20, which is to be opened against a spring force of a spring element, a speed sensor 22, and a control device 24.

A representation of the spring element of the volume accumulator 20 was dispensed with in the schematic representation according to FIG. 1. The spring element is dimensioned in such a way, in this case, that the resultant spring force is greater than a hydraulic force that can be generated by the master cylinder 12.

As is further shown in FIG. 1, the hydraulic brake system 10 comprises an electric drive 26, which is controlled via the control device 24 and which, in turn, is operatively connected to the spring element of the volume accumulator. The electric drive 26, the control device 24, and the speed sensor 22 are connected to each other via appropriate communication lines. The electric drive 26 is operatively connected to the spring element of the volume accumulator 20 in such a way in this case that an active return movement of the spring element and, therefore, the opening of the volume accumulator can be effectuated.

The following describes operation of the hydraulic brake system 10:

As soon as the control device 24 detects the blocking of the wheels by the speed sensor 22, the electric drive 26 is activated to open the volume accumulator 20 against the spring force of the spring element; at the same time, the valve arrangement 18 is mechanically or electrically closed.

The master cylinder 12 is therefore hydraulically separated from the wheel brake 16, i.e., a rider cannot further increase the pressure in the brake caliper, since the handle is quasi clamped.

The volume accumulator 20 is opened and the volume in the hydraulic line 14 therefore increases, and so the hydraulic pressure in the brake system 10 drops.

By the electric drive 26, the pressure can therefore be regulated for as long as necessary until the riding stability is ensured, even without the anti-lock function. The volume accumulator 20 is subsequently closed and the valve arrangement 18 is opened again, and so the brake system 10 functions entirely normally again.

FIG. 2a shows a pressure modulator 100 according to the invention. The pressure modulator 100 comprises a housing 101, which has a hydraulic inlet 102 and a hydraulic outlet 103. The hydraulic inlet 102 and the hydraulic outlet 103 are connected to each other by a hydraulic line 104, which is a component of the hydraulic line 14.

The hydraulic inlet 102 and the hydraulic outlet 103 can be implemented by means of plug-in connectors to enable a simple and tool-free assembly/disassembly when service is performed.

If the ABS function is not activated, a rotor bar 105 is located in a home position shown in FIG. 2a. The rotor bar 105 is moved to the right due to the spring force of the spring element 106, and so the rotor bar rests against a housing wall 107 (see FIG. 3a which shows the situation during an activated ABS function). In this position (see enlarged representation according to FIG. 2b), the rotor bar 105 presses against a valve element 108, which is designed as a ball, of the valve arrangement 18, and so the valve arrangement 18 is opened and the hydraulic fluid can flow through the valve arrangement 18. The hydraulic fluid then can continue to flow along a gap between the lateral face of the rotor bar 105 and the housing wall 109 to the hydraulic outlet 103.

When the anti-lock function is activated, the electric drive 26 designed as a linear drive 110 is activated and moves the rotor bar 105 into the position shown in FIG. 3a, against the spring force of the spring element 106. As a result, the volume accumulator 20 is opened. The volume of the hydraulic line 104 is therefore increased, and so the pressure applied by the hydraulic fluid onto a wheel brake is reduced and the wheel brake is opened. The displacement of the rotor bar 105 into the position shown in FIG. 3a also has the effect that the valve element 108 is moved to the left and, therefore, the valve arrangement 18 closes; see the representation in FIG. 3b. A master cylinder is therefore decoupled from the wheel brake.

The linear drive 110 comprises a cylindrical coil arrangement 112, by which the rotor bar 105 can be pulled in.

The spring element 106 is supported, at one end, on the rotor bar 105 and, at the other end, on a control piston 113 which is fixedly connected to the housing 101. The spring element is therefore supported on the housing 101 indirectly via the control piston 113. When the rotor bar 105 is displaced to the left, according to FIG. 3a, the volume 114 in an area of the spring element 106 in the rotor bar 105 is therefore reduced and the air located therein is compressed.

The rotor bar 105 is sealed with respect to the control piston 113 via a dynamic seal 115. If hydraulic fluid nevertheless gets into the interior of the rotor bar 105 due to a slip leakage, a system failure can result. To be able to remove the fluid, the control piston 113 is designed to be hollow and is connected to a closeable fluid outlet 116. The fluid outlet 116 can be closed using a screw 117.

Figure 4:
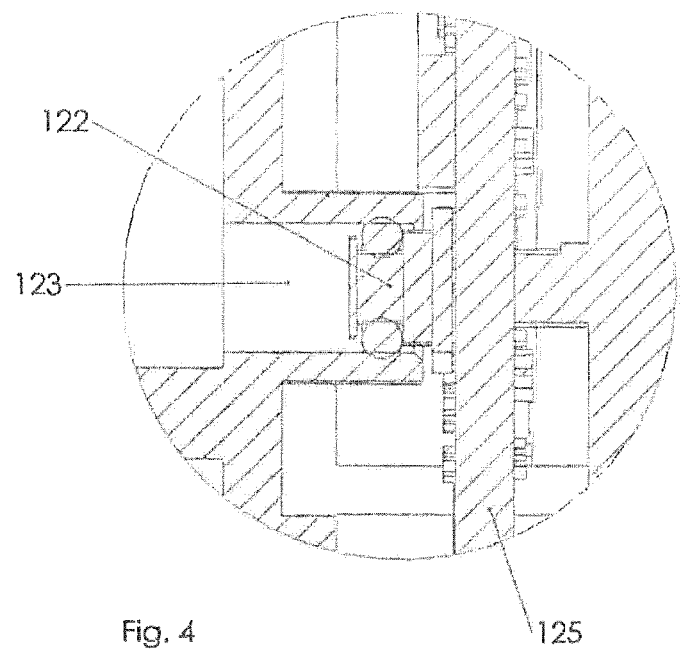
FIG. 4 is a sectional representation of an enlarged section of the pressure modulator.

A housing chamber 120 is provided in the housing 101 and directly adjoins the volume accumulator 20 in the axial direction. An electronic circuit 121, which represents the control device 24, is provided in the housing chamber 120. This electronic circuit 121 is therefore completely integrated into the pressure modulator 100. The electronic circuit can comprise an acceleration sensor, a microcontroller, and power output stages. The electronic circuit 121 also comprises a pressure sensor 122 (see FIG. 4), which is directly hydraulically connected to the volume accumulator 20. The housing wall 107 has a passage opening 123 for this purpose; see FIGS. 3a, 4.

An additional position detection of the rotor bar 105, e.g., by use of a Hall sensor, or a position detection of the rotor bar that is an alternative to the pressure sensor, may be included, according to the inventive principles.

In addition, an electric connection 124 is provided for transmitting control signals, for communicating with an external sensor system, for example, a speed sensor 22, and for power supply.

The hydraulic line 104 is routed through the electronic circuit 121, in an area of the valve arrangement 18. The electronic circuit 121 comprises a printed circuit board 125, on which the pressure sensor 122 is also disposed.

The electronic circuit 121 is disposed in the chamber 120 in a protected way. A separate housing does not need to be provided for the electronic circuit. Safety-critical and time-critical signals are therefore generated and are made available in the pressure modulator 100.

Figure 5:
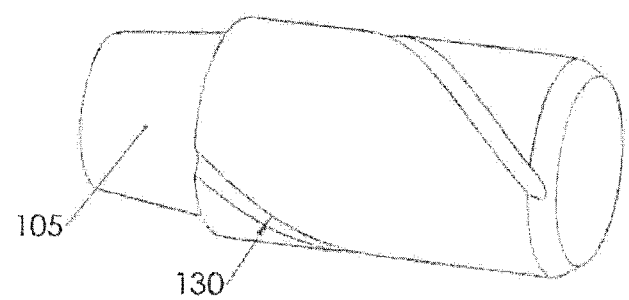
FIG. 5 shows a rotor bar.

FIG. 5 shows a rotor bar 105 comprising helical grooves 130, which are formed on the lateral face of the rotor bar and allow hydraulic fluid to flow through. Alternatively, the grooves 130 can extend in parallel to the longitudinal axis of the rotor bar 105. For that matter, the grooves 130 can be provided in any number and shape, without deviating from the scope and spirit of the invention.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A pressure modulator for an antilock braking system (ABS), comprising:
   a housing with a hydraulic inlet and a hydraulic outlet, where the hydraulic inlet is connected to the hydraulic outlet via a hydraulic line;
   a volume accumulator arranged to be opened against a spring force of a spring element, where the volume accumulator increases the volume of the hydraulic line during an activated anti-lock function; and
   a linear drive arranged with a rotor bar,
   wherein a displacement movement of the rotor bar effectuates an opening of the volume accumulator; and
   wherein the spring element is disposed in the rotor bar and is supported at least indirectly on the housing and the rotor bar.

2. The pressure modulator according to claim 1, further comprising a control piston that extends into the rotor bar, is fixedly connected to the housing, and on which the spring element is supported.

3. The pressure modulator according to claim 2, wherein the control piston is designed as a hollow body.

4. The pressure modulator according to claim 2, wherein the control piston is connected to a closeable fluid outlet.

5. The pressure modulator according to claim 1, wherein the rotor bar is disposed in the hydraulic line in such a way that hydraulic medium can flow around the rotor bar.

6. The pressure modulator according to claim 5, wherein the rotor bar comprises at least one hydraulic fluid recess.

7. The pressure modulator according to claim 6, wherein the at least one hydraulic fluid recess embodies an at least one groove positioned on a lateral face of the rotor bar, and wherein the at least one groove extends helically or substantially in parallel to a longitudinal axis of the rotor bar.

8. The pressure modulator according to claim 1, further comprising a valve arrangement provided in the hydraulic line that is actuated by the rotor bar.

9. The pressure modulator according to claim 1, further comprising an electronic circuit disposed in the housing.

10. The pressure modulator according to claim 9, further comprising a pressure sensor for detecting a pressure in the volume accumulator, wherein the pressure sensor is disposed on a printed circuit board comprising the electronic circuit.

11. The pressure modulator according to claim 10, wherein the hydraulic line is routed through the electronic circuit.

12. A pressure modulator for an antilock braking system (ABS), comprising:
   a housing with a hydraulic inlet and a hydraulic outlet, where the hydraulic inlet is connected to the hydraulic outlet via a hydraulic line;
   a volume accumulator arranged to be opened against a spring force of a spring element, where the volume accumulator increases the volume of the hydraulic line during an activated anti-lock function; and
   a linear drive arranged with a rotor bar, wherein a displacement movement of the rotor bar effectuates an opening of the volume accumulator;
   wherein the spring element is supported at least indirectly on the housing and the rotor bar, and further comprising precisely one dynamic seal that acts between the rotor bar and the control piston.

13. A pressure modulator for an antilock braking system (ABS), comprising:
   a housing with a hydraulic inlet and a hydraulic outlet, where the hydraulic inlet is connected to the hydraulic outlet via a hydraulic line;
   a volume accumulator arranged to be opened against a spring force of a spring element, where the volume accumulator increases the volume of the hydraulic line during an activated anti-lock function;
   a linear drive arranged with a rotor bar, wherein a displacement movement of the rotor bar effectuates an opening of the volume accumulator; and
   a pressure sensor for detecting a pressure in the volume accumulator,
   wherein the spring element is supported at least indirectly on the housing and the rotor bar.

14. A hydraulic brake system having an anti-lock function, comprising
   a master cylinder that generates a hydraulic pressure and is connected to a wheel brake in a hydraulically communicating way via a hydraulic line; and
   a pressure modulator;
   wherein the pressure modulator comprises:
   a housing with a hydraulic inlet and a hydraulic outlet, where the hydraulic inlet is connected to the hydraulic outlet via a hydraulic line;
   a volume accumulator arranged to be opened against a spring force of a spring element, where the volume accumulator increases the volume of the hydraulic line during an activated anti-lock function; and
   a linear drive arranged with a rotor bar,
   wherein a displacement movement of the rotor bar effectuates an opening of the volume accumulator and wherein the spring element is disposed in the rotor bar and is supported at least indirectly on the housing and the rotor bar.

* * * * *